May 25, 1971     B. B. COOPER     3,579,731
EXTRUSION HEAD
Filed Jan. 21, 1969     2 Sheets-Sheet 1
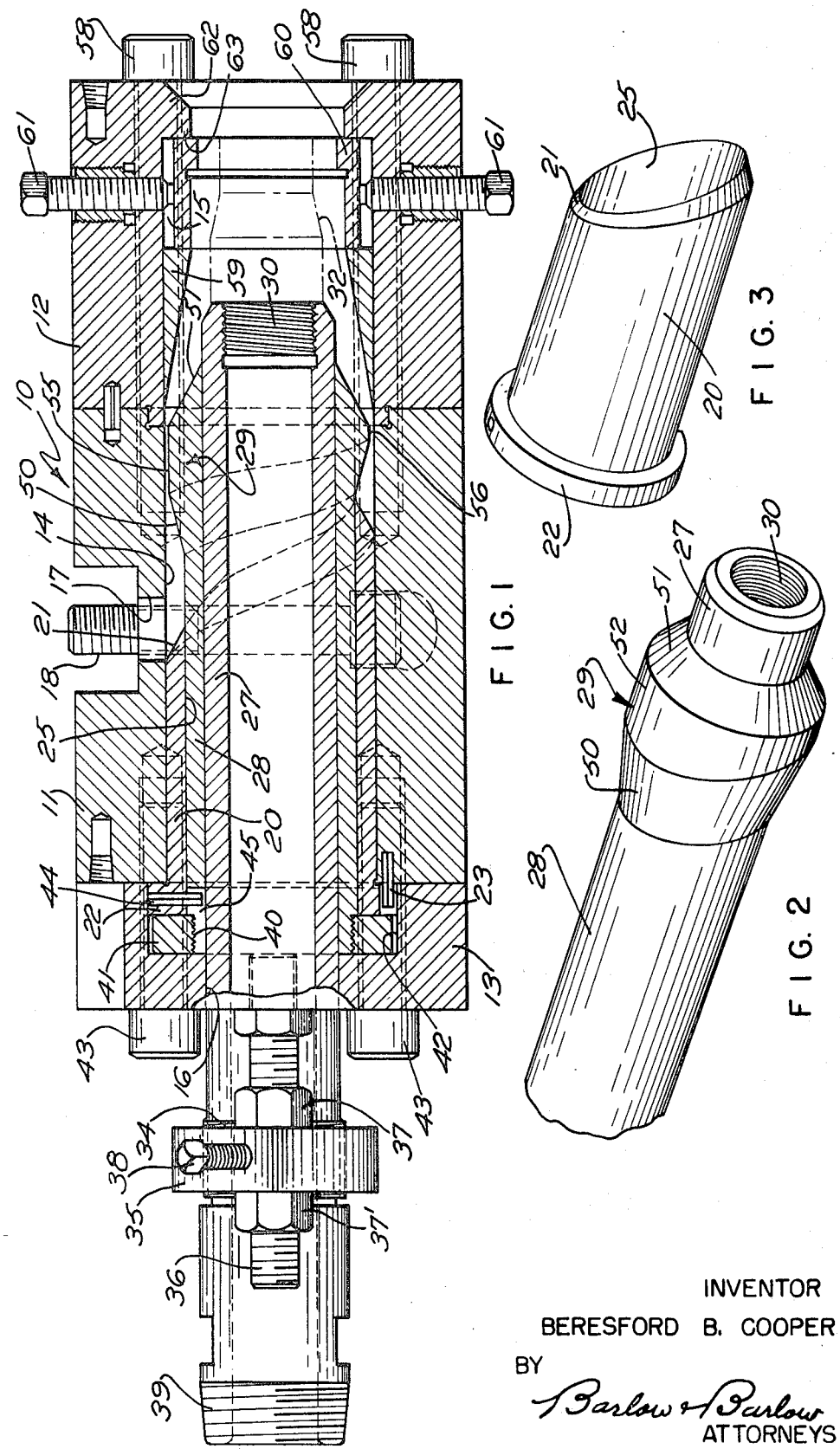
INVENTOR
BERESFORD B. COOPER
BY
*Barlow & Barlow*
ATTORNEYS May 25, 1971 B. B. COOPER 3,579,731
EXTRUSION HEAD
Filed Jan. 21, 1969 2 Sheets-Sheet 2

INVENTOR
BERESFORD B. COOPER
BY
*Barlow & Barlow*
ATTORNEYS

United States Patent Office 3,579,731
Patented May 25, 1971

3,579,731
EXTRUSION HEAD
Beresford B. Cooper, Mystic, Conn., assignor to
The Entwistle Company
Filed Jan. 21, 1969, Ser. No. 792,337
Int. Cl. B29f 3/04
U.S. Cl. 18—13     3 Claims

ABSTRACT OF THE DISCLOSURE

A cross head for plastic material having a guide tube with flow compensating means affixed thereto and which may be readily disassembled for cleaning.

BACKGROUND OF INVENTION

Extrusion heads of the cross head type conventionally have a guide tube for guiding a core transversely of the extrusion cylinder and onto an extrusion die. Difficulties are always experienced in having the plastic material which is inserted at right angles to the guide tube flow in a uniform volumetric rate. If the plastic does not flow evenly, the wall thickness of the material over the core that is to be covered will be non-uniform, and this will hold true even if one utilizes adjustment in the extrusion die. Non-uniformity of the wall thickness of the jacket extruded over the core is, of course, objectionable. Accordingly, a variety of means have been utilized in the past to compensate for this unevenness of flow. For example, one approach to the problem is to make the cylindrical passage of varying radial dimension as shown, for example, in U.S. patent specifications 3,111,713, and 3,206,802. Alternately, a compensator has been formed on the guide tube of a particular configuration as shown, for example, in U.S. patent specification 2,963,740. It is important in any of the prior art flow control devices that not only should the flow controlling means be simple, but also that the configuration of the control means be easy to machine or fabricate and that the cross head construction be arranged in such a way that the head is easy to clean at the end of a production run and that further no surfaces are presented to the flow pattern which will build up plastic in such a way as to impede the disassembly of the cross head.

SUMMARY OF THE INVENTION

The cross head of the present invention which is utilized in sheathing a core provides a device in which the guide tube has a compensator slidably received thereon, which compensator will create the necessary uniformity of flow of plastic material about the core. The head construction is made extremely simple, thus saving in manufacturing costs and more particularly in simplicity of disassembly for cleaning. When the present cross head is disassembled and the compensator tube is removed, a complete unobstructive passage is provided through the head to facilitate such cleaning.

BRIEF DESCRIPTION OF THE DRAWINGS

FIG. 1 is a longitudinal sectional view through a cross head manufactured in accordance with the invention in which the plastic feed screw and associated devices have been eliminated for clarity;

FIG. 2 is a fragmentary perspective view of the guide tube and compensator tube assembly;

FIG. 3 is a perspective view of a flow guidance tube;

DESCRIPTION OF THE PREFERRED EMBODIMENT

Figure 4:
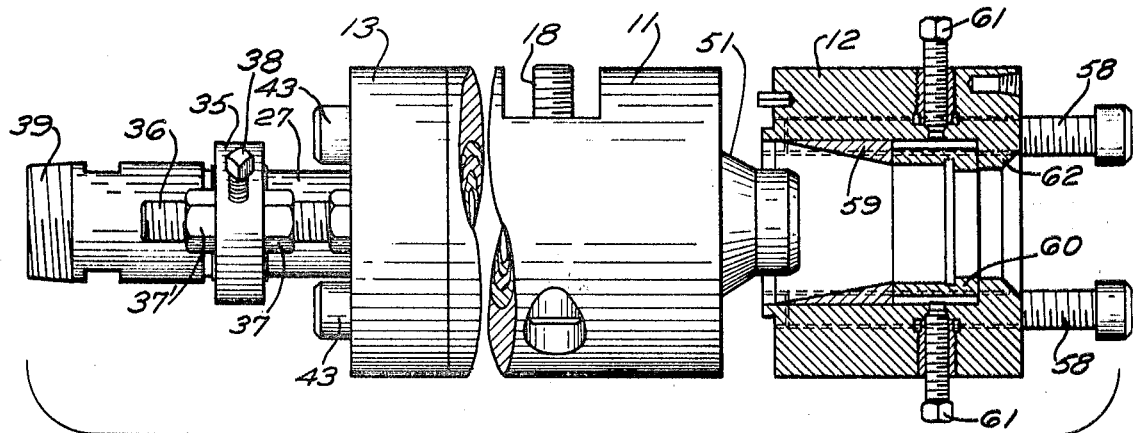
FIGS. 4, 5 and 6 are diagrammatic views showing the manner in which the cross head of the invention may be disassembled.
Figure 5:
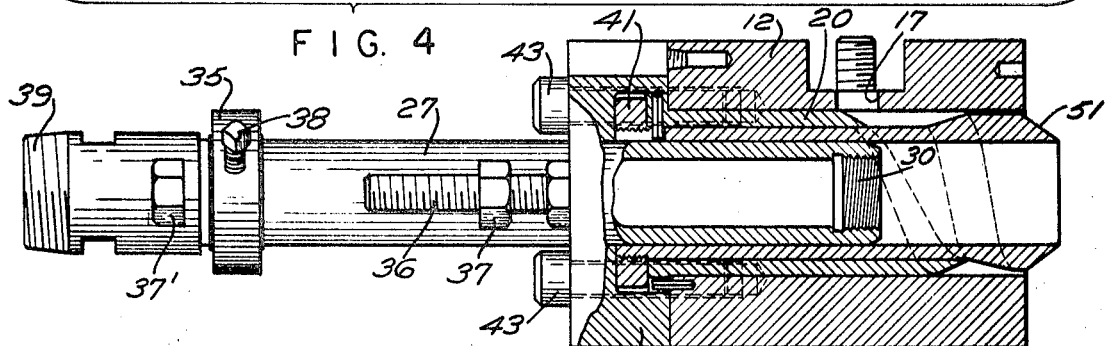
Figure 6:
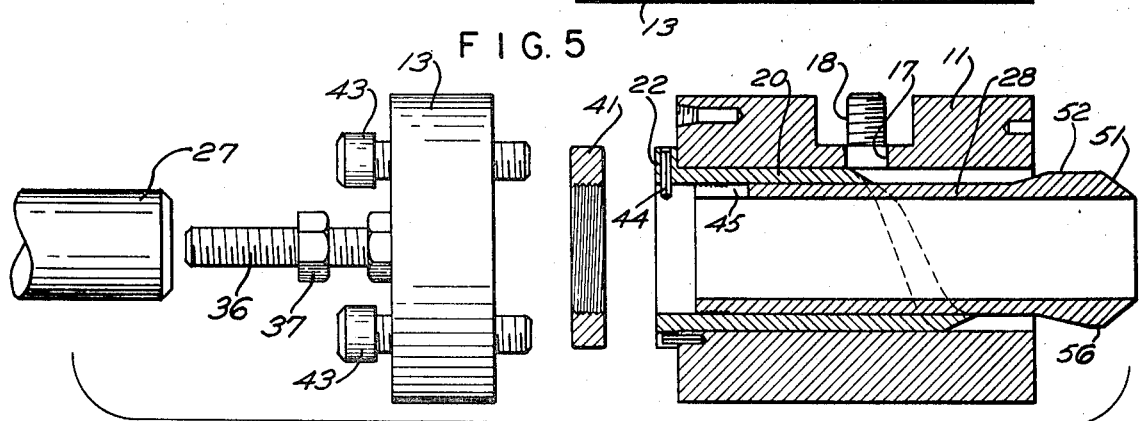
Figure 7:
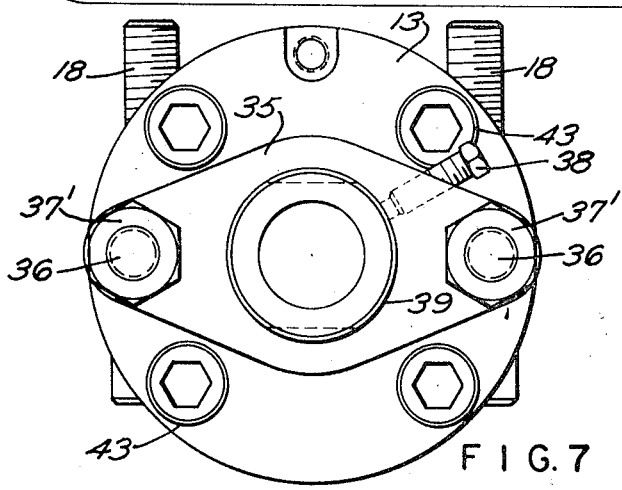
FIG. 7 is an end view taken from the lefthand end of FIG. 1 showing the cross head of the invention.

There is shown herein a cross head generally designated 10 which has a three-part body consisting of a central section 11, and end sections 12 and 13. Each of these sections has a bore therethrough, there being defined a bore 14 in the central part 11, a bore 15 in the end 12 and a bore 16 in the end 13. The central section 11 is provided with a delivery port 17 which communicates with the bore 14 and about which there is adapted to be attached the discharge portion of an extrusion machine which attachment can be facilitated by the presence of the cap screws 18 that pass through the wall of the center section 11 on a cord thereof as shown better in FIG. 7. The extrusion machine is not shown as its construction is well known to those skilled in the art. Fitted within the bore 14 is a flow guidance tube 20 which has an inner face 21 that is beveled and which is generally disposed at an acute angle to the axis of the tube 20. The opposite end of the flow guidance tube 20 is provided with a flange 22 and is positioned rotationally within the bore 14 by a locating pin 23 that passes into the central body 11 and through the flange 22. The flow guidance tube is provided with an inner bore designated 25 and fitting accurately within this bore 25 is an elongated compensator tube 28 having a compensator portion generally designated 29. A guide tube 27 is received within the compensator tube and has at one end thereof, adjacent the compensator portion 29, threads 30 which are adapted to receive a core tip 32, which is shown in broken lines, that may be of suitable configuration with a forwardly converging outer surface, and at the opposite end thereof it is provided with external threads as at 34 which threadingly receive a flange 35. The flange 35 is received on studs 36 which extend from the end member 13 and is positioned axially of the cross head assembly by nuts 37 received on the stud 36 and locked in position by nuts 37'. In this manner the position of the guide tube 27 may be varied with respect to the bore 14. Guide tube 27 is held from turning by a set screw 38 at its most rearward end is provided with pipe threads 39 for attachment to suitable core feeding apparatus.

The compensator tube 28 is provided at its rearward end with threads 40 and these threads receive a nut 41. The nut 41 abuts the end of the flow guide tube flange 22 and is received within a pocket or recess 42 of the end section 13 which end section is secured onto the main body section 11 by a number of cap screws 43. Rotational orientation of the compensator tube is had by reason of the locating pin 44 which passes through the flange 22 of the flow guide tube and which is received in a milled slot 45 in the end of the tube 28.

The compensator 29 is used to achieve equal pressures on the downstream side or the die portion of the cross head. It will be noted that the compensator 29 has a beveled entrance portion 50 as well as a beveled trailing portion 51. The beveled trailing portion 51 is substantially a right frusto-conical surface while the portion 50 is an oblique frusto-conical surface, the axis of which is acute to the axis of the tube. The cylindrical periphery of the compensator as at 52 which is between the bases of the cones, thus has progressively decreasing axial widths. In effect, therefore, by reference to FIG. 1, it can be said that we have a long surface as at 55 which is in close proximity to the bore 14 and a short surface as at 56 also in close proximity to the bore 14. Since there is basically a higher pressure at delivery port 17, which is located on the upper arcuate portion of the bore 14 as viewed in FIG. 1, and a lower pressure diametrically opposite or at the lower side of the bevel portion 21 of the flow guide tube, the length of the surface 52 has been varied so that the short side as at 56 is in direct communication with a low pressure region while a long side as at 55 is in communication with a high pressure region with a gradual change of length of the surface 52 intermediate these two portions.

The forward section 12 of the cross head assembly is held to the section 11 by a plurality of cap screws 58 and within the bore 15 of this section is received a wedge ring 59 which is designed to lead the plastic material to an annular die (not shown) which die is received in a die holder 60. The die holder 60 may be appropriately adjusted within limits with respect to the axis of the guide tube 27 by two sets of opposed guide adjusting screws 61 disposed on diametric lines at right angles to each other, only two being shown in FIG. 1. The die holder 60 is held in position against longitudinal movement by a radially inwardly extending shoulder 62 that has a surface 63 providing a shelf for the die holder since this shelf extends upstream with relationship to the flow of plastic. In effect, this will be the actual positioner for the die axially of the cross head.

It will be basically seen that as the cross head is assembled, which is shown more particularly in FIG. 1, that the plastic fed to the port 17 travels inwardly into the bore 14 and is carried somewhat forward by the beveled angularly oriented inner surface 21 of the flow guide tube and to travel down towards the die area must of course travel a greater distance as at 55 than at 56. Plastic material under pressure functions very much like a fluid in taking the path of least resistance but in the present arrangement the compensator 29 is aimed at presenting to the plastic sufficient areas so that the discharge will at least be at equal pressure circumferentially.

When it is necessary to clean the head, it will be assumed that the extruding feed screw has been stopped and the cross head is removed from the extruder screw by undoing the nuts that affix the screw to the cross head which nuts will be engaged with the stud 18. The next step would be to remove the housing part 12 which includes the die holder by removing the bolts 58 and in this way the part 12 including the die and wedge ring will be completely removed exposing the end of the guide tube and the die which is completely exposed and may be easily removed from the guide tube by unscrewing it. Next the nuts 37' are removed from studs 36 and this permits the inner core tube 27 to be withdrawn from within the compensator tube 28. The last operation involves the removal of the bolts 43 which permits the housing end 13 to be lifted off the housing exposing the nut 41 which is then unscrewed from the compensating tube 28 and then the compensating tube 28 is withdrawn to the right away from any built up plastic that would be between the port 17 and the compensator 29 which would restrict any other movement of the compensating tube. After all of the parts have been cleaned and the plastic taken out of the cross head, the cross head may be re-assembled in reverse order.

I claim:
1. A cross head for attachment to an extruder, said cross head comprising a housing having an axial bore with a delivery port communicating through said housing to said bore, a flow guidance tube received in said bore and having external flange means at one end thereof that make it possible for the flow guidance tube to pass into the bore of said housing but not through it, said flow guidance tube having a forward end slanting at an angle to the axis of said bore, a portion of said forward end positioned across said port, a flow compensator tube received within said flow guidance tube and having a forward end located forwardly of said flow guidance tube end and said port, a guide tube received within said flow compensating tube, said guide tube having at its most forward end internal threads which are adapted to receive a core tip, and a female die member received in said housing for cooperating with the core tip, said flow compensator having an enlarged portion with a forward frusto-conical end and a rearward oblique frusto-conical surface, said surfaces being joined by a cylindrical peripheral surface the longest axial portion thereof facing the portion of the housing bore in axial alignment with the delivery port to produce a high pressure region thereat with the shortest axial portion opposite therefrom producing a low pressure region thereunder.

2. A cross head as in claim 1 wherein the rearward end of said flow compensator tube has means for securing it to said housing and means for rotationally orienting the tube.

3. A cross head as in claim 2 wherein the securing means comprises a nut, said housing having a removable end section with a recess, said nut captured in said end section recess whereby removal of said end section and nut releases the compensator tube for forward movement away from the flow guidance tube.

References Cited

UNITED STATES PATENTS

| | | | |
|---|---|---|---|
| 2,760,230 | 8/1956 | Van Riper | 18—13(H) |
| 2,963,740 | 12/1960 | Yim, Jr. | 18—13(H) |
| 3,045,281 | 7/1962 | Skobel | 18—13(H) |
| 3,206,802 | 9/1965 | Van Riper | 18—13(H) |
| 3,211,818 | 10/1965 | Beckwith | 18—13(H) |

J. SPENCER OVERHOLSER, Primary Examiner

R. L. SPICER, Jr., Assistant Examiner